United States Patent
Su et al.

(10) Patent No.: US 9,391,929 B2
(45) Date of Patent: Jul. 12, 2016

(54) METHOD, DEVICE AND EMAIL SYSTEM FOR PROVIDING PUBLIC EMAIL

(71) Applicant: International Business Machines Corporation, Armonk, NY (US)

(72) Inventors: Bai Jian Su, Shanghai (CN); Jun Jing Zhang, Shanghai (CN); Peng Zhang, Shanghai (CN); Jun Song Zheng, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 486 days.

(21) Appl. No.: 13/922,701

(22) Filed: Jun. 20, 2013

(65) Prior Publication Data

US 2013/0346520 A1 Dec. 26, 2013

(30) Foreign Application Priority Data

Jun. 26, 2012 (CN) .......................... 2012 1 0214687

(51) Int. Cl.
*G06F 15/16* (2006.01)
*H04L 12/58* (2006.01)

(52) U.S. Cl.
CPC ............... *H04L 51/00* (2013.01); *H04L 51/16* (2013.01); *H04L 51/22* (2013.01)

(58) Field of Classification Search
CPC ....................................................... H04L 51/16
USPC ........................................................ 709/206
See application file for complete search history.

(56) References Cited

U.S. PATENT DOCUMENTS

| | | | |
|---|---|---|---|
| 5,493,692 A | 2/1996 | Theimer et al. | |
| 5,555,426 A * | 9/1996 | Johnson | G06Q 10/107 340/7.22 |
| 5,905,863 A * | 5/1999 | Knowles | G06Q 10/107 709/206 |
| 6,496,849 B1 | 12/2002 | Hanson et al. | |
| 7,328,242 B1 * | 2/2008 | McCarthy | G06Q 10/10 709/203 |
| 7,617,284 B2 * | 11/2009 | Salamuniccar | H04L 51/28 379/93.01 |
| 7,657,603 B1 * | 2/2010 | He | G06Q 10/107 709/206 |
| 7,720,919 B2 | 5/2010 | Khouri et al. | |
| 7,752,279 B2 * | 7/2010 | Hardy | G06Q 10/107 709/206 |
| 7,930,356 B2 | 4/2011 | Gawor et al. | |

(Continued)

FOREIGN PATENT DOCUMENTS

| | | |
|---|---|---|
| CN | 101115026 A | 1/2008 |
| CN | 101221638 A | 7/2008 |
| CN | 101675449 A | 3/2010 |

*Primary Examiner* — Imad Hussain
(74) *Attorney, Agent, or Firm* — Brian J. Colandreo, Esq.; Jeffrey T. Placker, Esq.; Holland & Knight LLP

(57) ABSTRACT

A method, device, and system for providing public email are disclosed. The method may include receiving an email. In response to receiving an email marked as public, the method may include acquiring information about public recipients. The method may also include sending the email marked as public to the public recipients and recipients specified in the email marked as public. According to one embodiment, email marked as public can be provided conveniently and timely without increasing the overburden of the email system.

21 Claims, 11 Drawing Sheets

(56) References Cited

U.S. PATENT DOCUMENTS

| | | | |
|---|---|---|---|
| 2003/0101065 A1* | 5/2003 | Rohall | G06Q 10/107 705/1.1 |
| 2003/0158903 A1* | 8/2003 | Rohall | G06Q 10/107 709/206 |
| 2003/0163537 A1* | 8/2003 | Rohall | G06Q 10/107 709/206 |
| 2003/0167310 A1* | 9/2003 | Moody | G06Q 10/107 709/206 |
| 2003/0177190 A1* | 9/2003 | Moody | G06Q 10/107 709/206 |
| 2006/0271630 A1* | 11/2006 | Bensky | G06Q 10/107 709/206 |
| 2007/0073871 A1* | 3/2007 | Adams | G06Q 10/107 709/224 |
| 2007/0282956 A1 | 12/2007 | Staats | |
| 2008/0021966 A1* | 1/2008 | Asami | G06Q 10/107 709/206 |
| 2008/0098070 A1* | 4/2008 | Heidloff | G06Q 10/107 709/206 |
| 2008/0098072 A1* | 4/2008 | Jones | G06Q 10/109 709/206 |
| 2008/0192302 A1* | 8/2008 | Rohall | G06Q 10/107 358/402 |
| 2008/0235334 A1* | 9/2008 | Gupta | G06Q 10/107 709/206 |
| 2009/0113433 A1 | 4/2009 | Dunshea et al. | |
| 2009/0132949 A1 | 5/2009 | Bosarge | |
| 2009/0150495 A1* | 6/2009 | Sun | H04L 12/58 709/206 |
| 2009/0157819 A1* | 6/2009 | Hampton | H04L 12/5835 709/206 |
| 2010/0198864 A1* | 8/2010 | Ravid | G06F 17/30705 707/769 |
| 2010/0262917 A1 | 10/2010 | Hardy et al. | |
| 2011/0258268 A1* | 10/2011 | Banks | G06Q 10/06 709/206 |
| 2011/0320538 A1* | 12/2011 | Ickman | G06F 9/542 709/206 |
| 2012/0023174 A1* | 1/2012 | Tu | H04L 51/24 709/206 |
| 2012/0042019 A1* | 2/2012 | Koul | G06Q 10/107 709/206 |
| 2012/0210334 A1* | 8/2012 | Sutedja | G06Q 10/107 719/314 |
| 2013/0024780 A1* | 1/2013 | Sutedja | G06Q 10/107 715/752 |
| 2013/0157626 A1* | 6/2013 | Talwar | H04W 4/16 455/413 |
| 2013/0262590 A1* | 10/2013 | Patil | G06Q 10/107 709/206 |
| 2013/0290435 A1* | 10/2013 | Martin | H04L 51/28 709/206 |
| 2013/0290436 A1* | 10/2013 | Martin | G06Q 10/107 709/206 |

* cited by examiner

|          |               |           | Email Information List 315 |
|----------|---------------|-----------|--------------------------------|
| Email ID | Root Email ID | Recipient | Storage Address                |
| 0001     | 0001          | B C       |                                |
| 0002     | 0001          | A C D     | XXXE                           |
| 0003     | 0001          | A B E     |                                |
| 0004     | 0001          | A B C     | XXXF                           |

FIG.4b

Public Recipient List 307

Root Email ID 0001:

Public Recipients A B C D E

FIG.6c

METHOD, DEVICE AND EMAIL SYSTEM FOR PROVIDING PUBLIC EMAIL

RELATED APPLICATIONS

This application is based on and claims the benefit of priority from Chinese Patent Application 201210214687.X, filed on Jun. 26, 2012, the entire disclosure of which is incorporated herein by reference.

BACKGROUND

The present disclosure relates to email, and more specifically, to a method, device and email system for providing public email.

Nowadays, most people adopt email systems to discuss certain topic. With email reply and forward functions, many people can participate in discussions initiated from an original email. All emails involved in multi-level (multi-round) reply and forward processes of an original email are collectively called as a topic. The term "topic" as used herein is not meant to the "subject field" of an email. In multi-level reply and forward processes of an original email, there may be modifications to "subject field" of emails belonging to the same topic. On the contrary, although two emails may have the same subject, they might not necessarily be those produced in multi-level reply and forward processes of a certain original email, and thus do not belong to the same topic.

SUMMARY

According to an aspect of the present disclosure, a method for providing public email is provided, comprising: receiving an email; in response to receiving an email marked as public, acquiring information about public recipients; sending the email marked as public to the public recipients and recipients specified in the email marked as public.

According to an aspect of the present disclosure, a device for providing public email is provided, comprising: a receiving component configured to receive an email; an acquisition component configured to, in response to receiving an email marked as public, acquire information about public recipients; a sending component configured to send the email marked as public to the public recipients and recipients specified in the email marked as public.

According to an aspect of the present disclosure, a system for providing public email is provided, comprising: a device for providing public email mentioned above; and an email client device configured to communicate with the device for providing public email.

According to an aspect of the present disclosure, a public email is provided, in which not only recipients specified in the public email, but also some or all of those who participated in discussions of a topic before but are not included in recipients of the current public email can see the public email timely.

According to an embodiment of the present disclosure, public email can be provided conveniently without increasing the overburden of the email system.

According to an embodiment of the present disclosure, a discusser participating in an email discussion of a certain topic later may be allowed to acquire contents of all emails for the topic before his joining in the discussion, and to learn more about the discussions of the topic.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 4a-b show status of a public email box and an email information list when the process of FIG. 1b is completed according to one embodiment of the present disclosure, respectively.

FIG. 6a-c show status of the public email box, a tree storage unit, and a public recipient record list when the process of FIG. 1b is completed according to another embodiment of the present disclosure, respectively.

DETAILED DESCRIPTION

Some example embodiments will be described in more detail with reference to the accompanying drawings, in which the example embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

In some embodiments the present disclosure may provide public email for some or all of those who have participated in discussions of a topic before but are not included in recipients of a current email replied by a user. Further, in some embodiments the present disclosure may provide public email without the need of multiple times of recipient confirmation, so as to improve user operation efficiency.

Figure 1A:
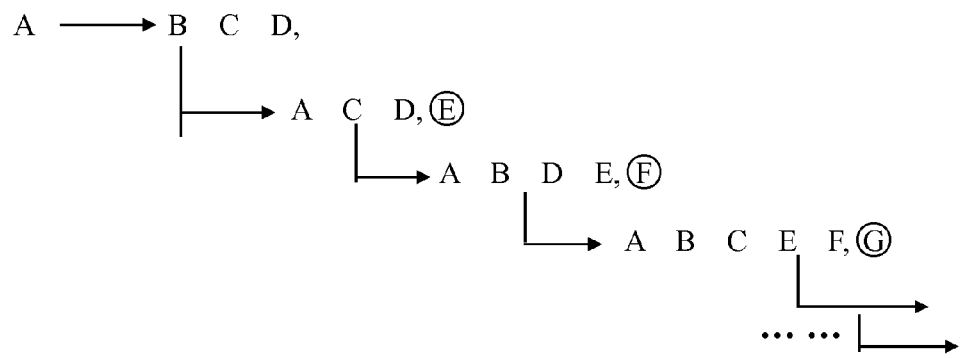
FIG. 1a schematically shows a scenario of discussion through sequential email replies.

FIG. 1a schematically shows a scenario of performing a discussion through sequential email replies. In the scenario shown in FIG. 1a, user A has sent an email to users B, C, D. After that, user B replies to the email in a "reply all" manner while adding a new user E in recipients. For the newly added user E, he/she can view all previous emails without missing email content. Next, user C replies in a "reply all" manner while adding a new user F in the recipients. For the newly added user F, he/she can also view all previous emails without missing email content. Similarly, if user D then replies in a "reply all" manner while adding a new user G in the recipients, for the newly added user G, he/she can view all previous emails without missing email content. All emails in FIG. 1a compose a topic. FIG. 1a demonstrates that all recipients (including newly added ones) can view contents of all other emails of the topic, so long as sequential replies are ensured. However, the manner of email replying shown in FIG. 1 is merely an ideal status, in most cases, a scenario shown in FIG. 1b usually occurs when multiple recipients are involved.

Figure 1B:
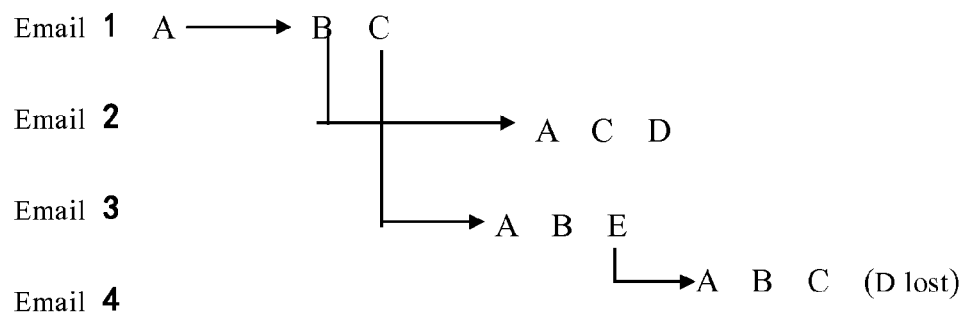
FIG. 1b schematically shows a scenario of discussion through parallel email replies.

FIG. 1b schematically shows a scenario of performing a discussion through parallel email replies. In the scenario in which the discussion is performed through parallel email replies, multiple recipients may reply emails in parallel while adding new recipients in their replied emails. For example, in FIG. 1b, user A sends an email 1 to users B and C. Then, users B and C reply the email sent by user A in parallel, to generate emails 2 and 3. In email 2, user B replies in a "reply all" manner, while adding a new user D. In email 3, user C replies in a "reply all" manner, while adding a new user E. Next, in email 4, if user E replies in a "reply all" manner again, user D cannot see the reply, because user D is not in recipients of the replied email. In fact, however, D as one participant of the topic may need to be acquainted with contents of all emails about that topic.

Figure 2:
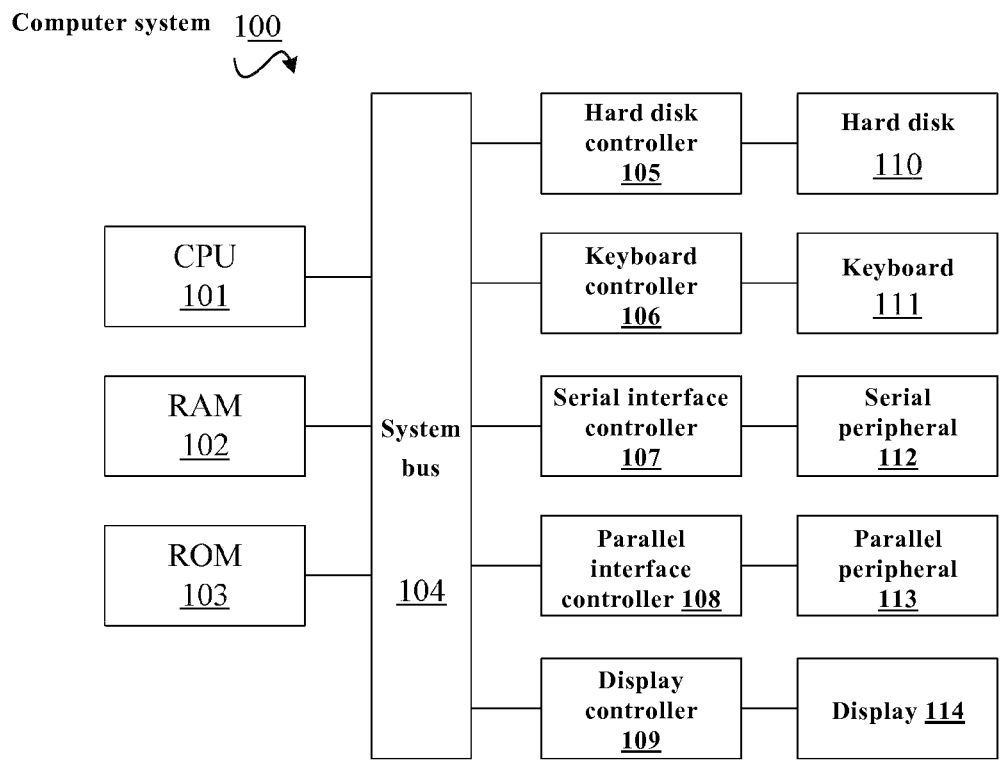
FIG. 2 shows an example computer system which may be applicable to implement the embodiments of the present disclosure.

FIG. 2 shows an example computer system 100 which may be applicable to implement the embodiments of the present disclosure. As shown in FIG. 2, the computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 may be coupled to the System Bus 104. Hard Drive 110 may be coupled to Hard Drive Controller 105. Keyboard 111 may be coupled to Keyboard Controller 106. Serial Peripheral Equipment 112 may be coupled to Serial Interface Controller 107. Parallel Peripheral Equipment 113 may be coupled to Parallel Interface Controller 108. And, Display 114 may be coupled to Display Controller 109. It should be understood that the structure as shown in FIG. 1 is only for the exemplary purpose rather than any limitation to the present disclosure. In some cases, some devices may be added to or removed from the computer system 100 based on specific situations.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Emails sent by senders to recipients may be forwarded through email servers. For example, first, an email server may receive an email, identify recipients of the email, and then send the email to the recipients of the email. In some embodiments the present disclosure may relates to processes on the server side. According to an aspect of the present disclosure, if a public email may be received by a server, the email may be sent to not only recipients of said email, but also others who participated in discussions of a topic before but are not included in the recipients of the current email.

In some embodiments the present disclosure may provide public emails to some or all of those who participated in discussions of a topic before but are not included in recipients of an email currently replied by a user, the present disclosure may provide public emails to all of those who participated in discussions of a topic before but are not included in recipients of an email currently replied by a user, or provide public emails to part of those who participated in discussions of a topic before but are not included in recipients of an email currently replied by a user, wherein the part can be selected based on a reciprocity policy: for non-public emails, they might have been omitted to be set as public emails just because their senders do not want others to know whom those emails are sent to; thus, a public email may be only provided to recipients who have sent public emails previously involved in the topic, in addition to recipients specified in the current public email per se.

In an embodiment of the present disclosure an email may be set to be a public email if its sender wants the email to be received by more others participating in the present topic. When it is determined by a server that a public email has been sent by a sender, it may check recipients of all other emails involved in the topic or recipients of all other public emails, and may send the public email to all these recipients and recipients of the current public email. If the sender wants all of those who participated in discussions of the topic before but are not included in recipients of the current pubic email to receive the current public email, he may select to look up recipients of all other emails involved in the topic, and may send the email to them and recipients of the current pubic email. If the sender wants all of those who were recipients of public emails involved in the topic before, but are not included in recipient of the current public email, to receive the current public email, he can select to look up recipients of all other public emails involved in the topic, and may send the email to them and recipients of the current public email.

In this manner, recipients included in all other emails involved in a topic that have been sent currently or recipients included in the recipients of the other public emails but are not included in recipients of a current public email, may receive the public email timely. For those emails that are not set to be public emails, they may be sent as normal. Thus, for those emails with higher level of importance and less privacy, they can be obtained by more persons through being set to be public, for those private or emails with higher level of importance, only specific persons are permitted to obtain those emails.

Consider that although recipients included in all other emails involved in a topic that have been sent currently or recipients of other public emails but not included in recipients of an email replied currently by a user, may receive the public email timely, those recipients may be unable to master all contents of the topic through the current public email, because the current public email does not contain contents of all other public emails involved in the topic, a consolidation function may be provided in the present disclosure. When consolidation is selected by a recipient of a public email, the server may find out contents of all of other public emails involved in the topic to consolidate those contents and the content of the current public email.

Figure 3:
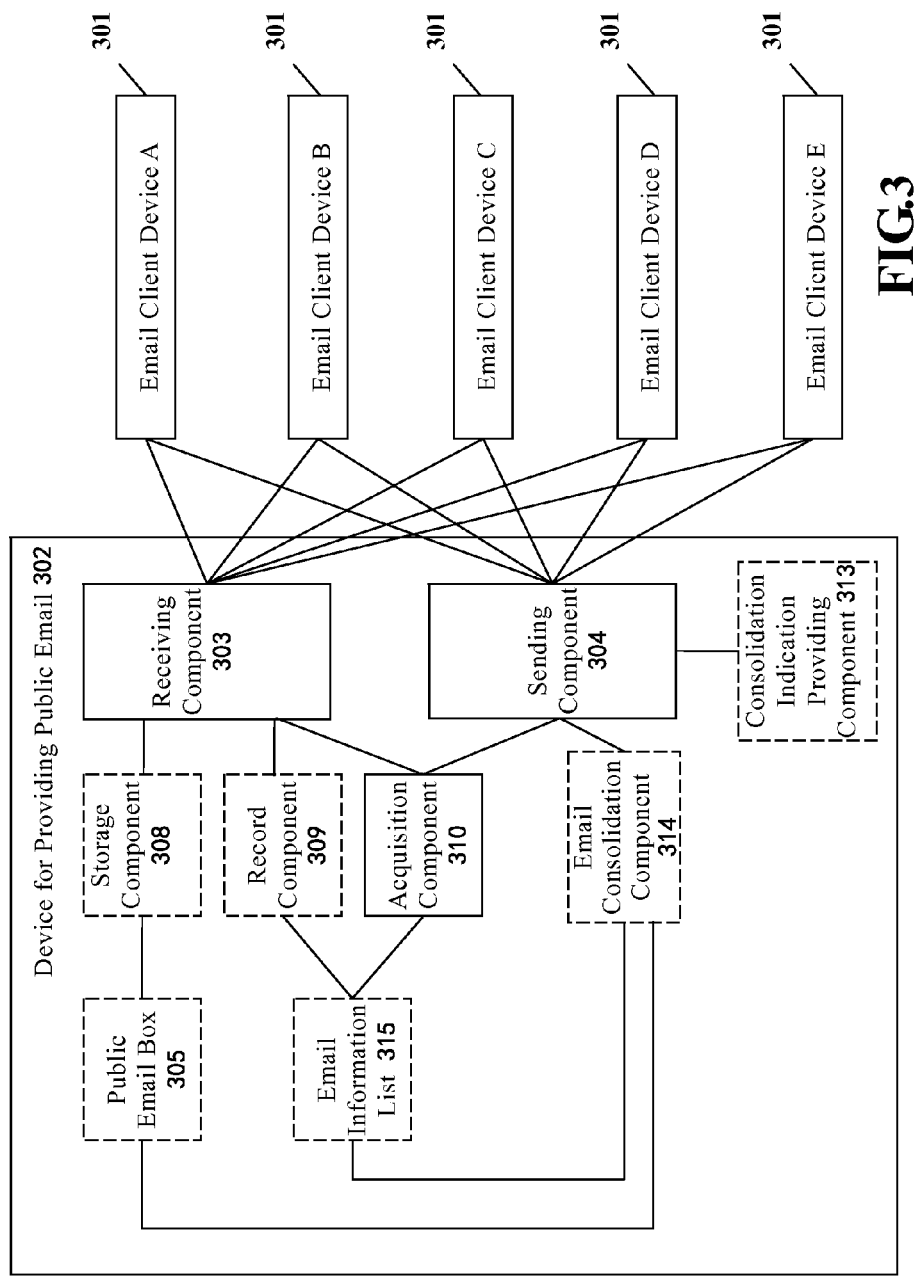
FIG. 3 shows a block diagram of a system for providing public email according to an embodiment of the present disclosure.

FIG. 3 shows a block view of a system 3 for providing public email according to an embodiment of the present disclosure.

The system 3 for providing public email may include email client devices 301 and a server side device 302 for providing public email.

Although there are only five email client devices A-E shown in FIG. 3, obviously, more email client devices 301 are also possible.

The device 302 for providing public email may include a receiving component 303, an acquisition component 310, and a sending component 304.

Optionally, the device 302 for providing public email may further include a storage component 308, a record component 309, a public email box 305, an email information list 315, an email consolidation component 314, and a consolidation indication providing component 313.

The receiving component 303 may receive emails.

The acquisition component 310 may acquire information about public recipients in response to receiving an email marked as public.

The sending component 304 may send the email marked as public to the public recipients and recipients specified in the email marked as public.

Optionally, the acquisition component 310 may acquire, as the public recipients, information about recipients of emails having the same root email as the received email marked as public. Because a topic includes all emails involved during multi-level replies and forwards of an original email, the original email may be a root email. Thus, there may be one to one correspondence between a root email and a topic.

Optionally, the storage component 308 may store an email marked as public into the public email box 305.

Optionally, the record component 309 may record, in an email information list, the email ID, the root email ID, recipients of a received email, and its storage address in the public email box. Servers may have such a mechanism: once an email is received, it may assign a new email ID to the email; if the email is produced through reply or forward, it may automatically carry with the parent email ID of its parent email on which the reply/forward is based. Thus, when an email is received, the server may know at least its email ID and parent email ID. The root email ID may be determined as follows: if the received email does not carry with a parent email ID, it is not an email produced through reply or forward, and its email ID may be just the root email ID; if the received email carries with a parent email ID, it may be an email produced through reply or forward, a root email ID in a corresponding record of its parent email in the email information list may be used as its root email ID. If the received email is not marked as public, its storage address in the public email box may be NULL.

Optionally, the acquisition component 310 may combine all recipients of emails having the same root email ID as the received email marked as public in the email information list 315 to produce the public recipients, or combine all recipients of emails having the same root email ID as the received email marked as public in the email information list 315 and having non-null storage addresses in the public email box to produce the public recipients. Through the former manner, a public email may be provided to all of those who participated in discussions of a topic before but are not included in recipients of a current user-replied email. Through the latter manner, a current public email may be provided to not only recipients specified in the current public email itself, but also recipients who have sent public emails involved in the topic before.

Optionally, the consolidation indication providing component 313 may provide a consolidation indication to recipients who have received the email marked as public, so that those recipients may select consolidation through clicking on the indication.

Optionally, the email consolidation component 314, in response to selecting consolidation by a recipient of the email after receiving the email marked as public, may search in the email information list 315 for all emails having the same root email ID as the email marked as public and having non-null storage addresses in the public email box, looks up for contents of those emails in the public email box 305, and consolidates their contents and content of the current email.

Still taking FIG. 1b as an example to illustrate how various components of the device 302 for providing public email operate in the example of FIG. 1b.

Two situations have been discussed above. The first is that the sender of a current public email wants to let all of those who participated in discussions of a topic before but are not included in recipients of a current public email to receive the current public email. The second is that the sender of a current public email wants to let all of those who were recipients of public emails involved in a topic before but are not included in recipients of a current public email to receive the current public email. Below, these two situations will be discussed respectively.

The first situation will be discussed at first.

(1) Email 1

User A wants to send email 1 to users B, C. Email 1 is not marked as public.

The receiving component 303 may receive email 1. At that point, an ID mechanism of a server may automatically assign an email ID to email 1, that is, 0001.

Because email 1 is not a public email, the sending component 304 may directly send the email to recipients B and C specified in email 1.

Because email 1 does not carry with a parent email ID, it may not be an email produced through reply/forward. So that, 0001 may also be its root email ID. The record component 309 may record, in the email information list 315, an email ID (0001), a root email ID (0001), recipients (B, C), a storage address in the public email box (null, since it may not be a public email), as shown in FIG. 4b.

(2) Email 2

Next, user B replies email 1 sent by user A, adds a recipient D when replies, and selects to mark the replied email as public to produce a public email 2.

The receiving component 303 may receive the public email 2. The ID mechanism of the server may first find that a parent email ID (0001) is carried on email 2. Then, an email ID may be automatically assigned to email 2 by the ID mechanism of the server, that is, 0002.

At that point, there may only be one email having the same root email ID as email 2 in the email information list 315, that is, email 1. Thus, public recipients that may be acquired by the record component 309 are B, C.

Because A, C, D are specified in email 2 as recipients, B, C may be acquired as public recipients by the record component 309, the sending component 304 may actually send the email to A, B, C, D or A, C, D.

Figure 4A:
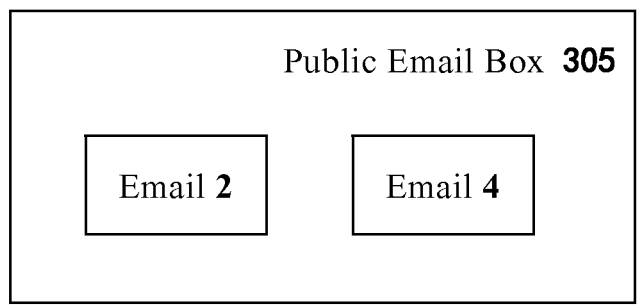

Because email 2 is a public email, the storage component 308 may store email 2 in the public email box 305, as shown in FIG. 4a.

Because email 2 carries parent email ID (0001), indicating that email 2 is an email produced through reply/forward, the root email ID (0001) in the record of its parent email (i.e., email 1 with the email ID (0001)) in the email information list 315 may also be used as the root email ID of email 2.

The record component 309 may record, in the email information list 315, the email ID (0002), the root email ID (0001), recipients (A, C, D) of email 2 and its storage address (XXXE) in the public email box, as shown in FIG. 4b.

(3) Email 3

Next, user C and user B reply the email sent by user A in parallel, and a recipient E is added in the reply to generate email 3. Email 3 is not marked as public.

Receiving component 303 may receive the email 3. The ID mechanism of the server may firstly finds that email 3 carries parent email ID (0001). Then, the ID mechanism of the server may automatically assign an email ID to email 3, i.e., 0003.

Because email 3 is not a public email, the sending component 304 may only sends email 3 to recipients A, B, E specified in email 3.

Because a parent email ID (0001) is carried on email 3, it is an email produced through reply/forward. The root email ID (0001) in the record of its parent email 1 with the email ID 0001 in the email information list 315 may be used as the root email ID of email 3.

The record component 309 may record, in the email information list 315, the email ID (0003), the root email ID (0001), recipients (A, B, E) of email 3 and its storage address (null) in the public email box, as shown in FIG. 4b.

(4) Email 4

When user E replies to all, users A-C are all in recipients of the replied email. User E selects to mark the replied email as public and a public email 4 is produced.

The receiving component 303 may receive public email 4. The ID mechanism of the server may first finds that parent email ID (0003) is carried on email 4. Then, the ID mechanism of the servers may automatically assign an email ID to email 4, i.e., 0004.

At that point, emails 1-3 in the email information list 315 may be those having the same root email ID as email 4. Thus, public recipients acquired by the record component 309 are A, B, C, D, E.

Because A, B, C are specified as recipients in email 4, A, B, C, D, E may be public recipients acquired by the record component 309, the sending component 304 may actually send the email to A, B, C, D, E or A, B, C, D. Thus, recipient D who is not specified in email 4 can receive email 4.

Because email 4 is a public email, the storage component 308 may store email 4 in the public email box 305, as shown in FIG. 4a.

Because a parent email ID (0003) is carried on email 4, it is an email produced through reply/forward. At that point, the root email ID (0001) in the record of its parent email 3 with the email ID 0003 in the email information list 315 may be used as the root email ID of email 4.

The record component 309 may record, in the email information list 315, the email ID (0004), the root email ID (0001), recipients (A, B, C) of email 4 and its storage address (XXXF) in the public email box, as shown in FIG. 4b.

As described above, user D may also receive email 4 after it is sent by user E. However, because email 4 is based on a reply to email 3, it may not have content of email 2. Thus, if user D wants to acquire all content about the topic, he may have to review content of email 2 anyway.

A consolidation function may be provided in an embodiment of the present disclosure. For example, the consolidation indication providing component 313 may provide a consolidation indication on email 4 sent to user D. I user D selects the consolidation indication, the email consolidation component 314 may searche emails (i.e., emails 2, 4) having the same root email ID (i.e., 0001) as the received email 4 in the email information list 315 and having non-null storage addresses in the public email box, may find out contents of those emails in the public email box 305, and may consolidate their contents and the content of current email 4. Thereby, user D may be able to see consolidated emails (emails 2, 4), and thus obtain full information about the topic.

Below, a second situation will be discussed.

Still taking FIG. 1b as an example.

(1) Email 1

Email 1 is not a public email. Thus, it may not be necessary to acquire public recipients. The process (1) of the second situation may be generally the same as the process (1) of the first situation.

(2) Email 2

After the receiving component 303 has received the public email 2, an acquisition component 310 may look up in the email information list 315. There may only be one email having the same root email ID as email 2 in the email information list 315, i.e., email 1. However, email 1 is not a public email because its storage address in the public email box is null. Hence, no public recipient may be acquired by the acquisition component 310. The sending component 304 may send email 2 to A, C, D. Other part of the process (2) of the second situation may be generally similar to that of the process (2) of the first situation.

(3) Email 3

Email 3 is not a public email, and hence it may not be necessary to acquire public recipients. The process (3) of the second situation may be generally the same as the process (3) of the first situation.

(4) Email 4

After the receiving component 303 has received the public email 2, the acquisition component 310 may look up in the email information list 315. There may only be one email, in the email information list 315, having the same root email ID as email 4 and having a non-null storage address in the public email box, i.e., email 2. Thus, public recipients that may be acquired by the acquisition component 310 are A, C, D.

Because recipients specified in email 4 are A, B, C, public recipients that may be acquired by the acquisition component 310 are A, C, D, the sending component 304 may actually send this email to A, B, C, D. Thereby, recipient D who is not in the specified recipients of email 4 may receive email 4. Other part of the process (4) of the second situation may be generally similar to that of the process (4) of the first situation.

Figure 5:
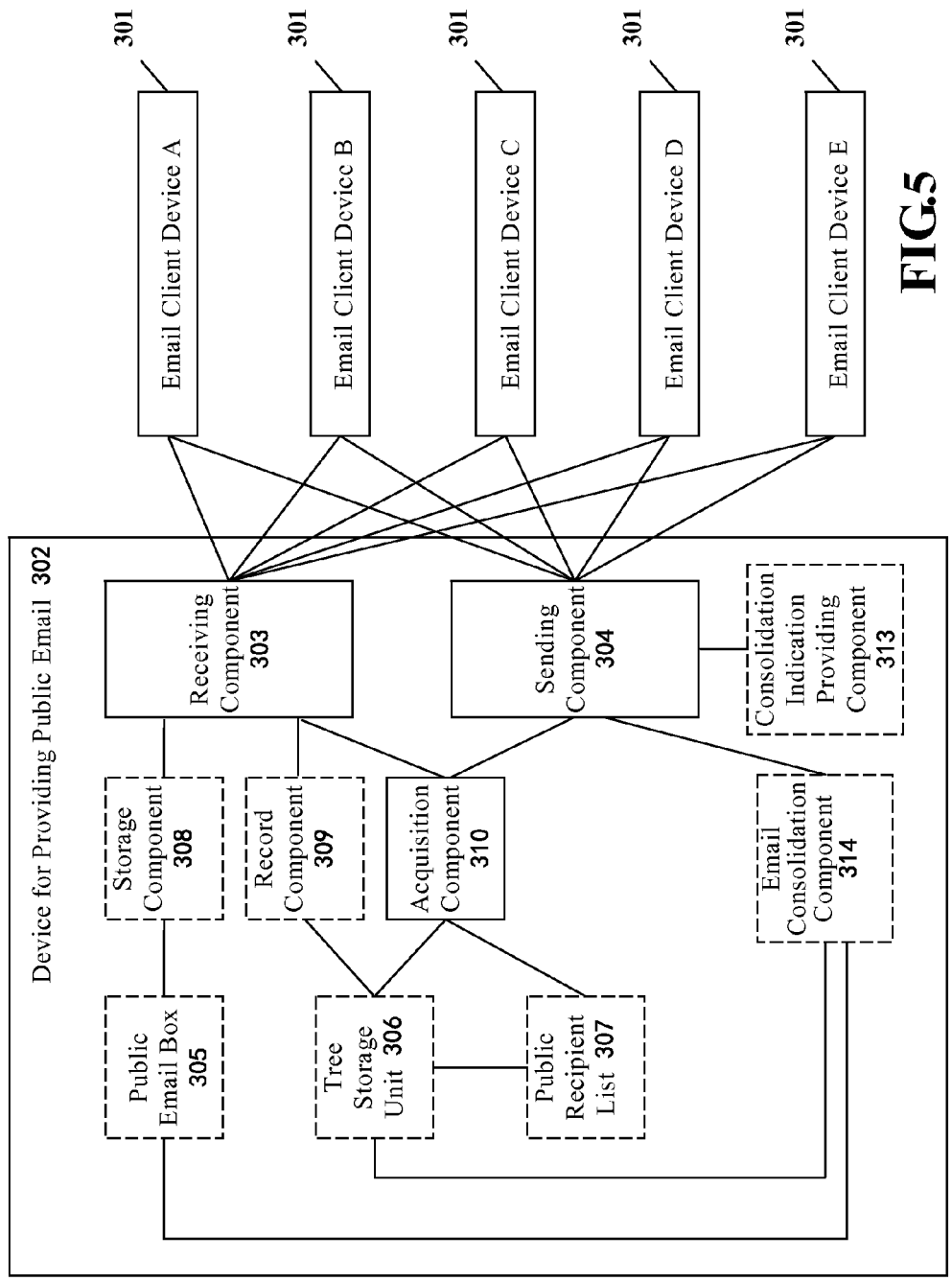
FIG. 5 shows a block diagram of a system for providing public email according to another embodiment of the present disclosure.

FIG. 5 shows a block diagram of a system 3 for providing public email according to another embodiment of the present disclosure.

The structure shown in FIG. 5 differs from that of FIG. 3 in that the embodiment of FIG. 5 has a tree storage unit 306 and a public recipient record list 307, instead of the email information list 315. Other part of the FIG. 5 may be generally similar to that of FIG. 3 in structure.

The receiving component 303 may receive an email.

The acquisition component 310 may acquire information about public recipients in response to receiving an email marked as public.

The sending component 304 may send the email marked as public to the public recipients and recipients specified in the email marked as public.

Optionally, the acquisition component 310 may acquire recipient information of emails having the same root email as the received email marked as public as the public recipients.

Optionally, the storage component 308 may store the email marked as public into the public email box 305.

Optionally, in response to receiving an email, the record component 309 may record email ID, parent email ID, recipients of the received email, and its storage address in the public email box at a corresponding node in a tree stored in the tree storage unit 306. Due to the ID mechanism of the server, email ID, parent email ID of the received email may be known easily. If there is no parent email ID carried on the received email, the email ID, recipients of the received email, and its storage address in the public email box may be recorded at a root node of a new tree in the tree storage unit 306. If there is a parent email ID carried on the received email, the email ID, parent email ID, recipients of the received email, and its storage address in the public email box may be recorded at a child node of a node having the parent email ID as its email ID. If the received email does not have a public marked thereon, its storage address in the public email box may be null.

Optionally, if the sender of the current public email wants all of those who have participated discussions about the current topic before, but are not included in the recipients of the current public email to receive the current public email (the first situation), it may be done through the following manner setting a public recipient record list 307 corresponding to the tree in the tree storage unit 306. The tree storage unit 306 may have a trigger mechanism, by which in response to adding a new node to a tree in the tree storage unit 306, recipients recorded at the new node may be combined to the public recipient record list 307 corresponding to that tree. The acquisition component 310, according to a tree in the tree storage unit 306 where a node corresponding to the parent email ID of the received email marked as public locates, may acquire public recipients from the public recipient record list 307 corresponding to that tree.

Optionally, if the sender of the current public email wants all of those who have been recipients of public emails of the current topic before, but are not included in the recipients of the current public email to receive the current public email (the second situation), it may be done through the following manner: setting a public recipient record list 307 corresponding to a tree in the tree storage unit 306. The tree storage unit 306 may have a trigger mechanism, by which in response to adding a new node to a tree in the tree storage unit 306, which has a non-null storage address in the public email box recorded thereon, recipients recorded at the new node may be combined to the public recipient record list 307 corresponding to that tree. The acquisition component 310, based on a tree in the tree storage unit 306 where a node corresponding to the parent email ID of the received email marked as public locates, may acquire public recipients from the public recipient record list 307 corresponding to that tree.

Optionally, the consolidation indication providing component 313 may provide a consolidation indication for recipients of the received email marked as public, so that those recipients may select consolidation through clicking on the indication.

Optionally, the email consolidation component 314, in response to selecting consolidation by a recipient of the email after receiving the email marked as public, may search for all emails having non-null storage addresses in the public email box on a tree in the tree storage unit 306 where the node of the email locates, may find out contents of those emails in the public email box 305, and may consolidate their contents and the content of the current email.

Still taking FIG. 1b as an example to illustrate how various components of the device 302 for providing public email operate in the example of FIG. 1b.

Still beginning our discussion from the first situation.

(1) Email 1

User A wants to send email 1 to users B, C. Email 1 is not marked as public.

The receiving component 303 may receive email 1. At that point, an ID mechanism of the server may automatically assigns an email ID to email 1, that is, 0001.

Because email 1 is not a public email, the sending component 304 may directly send the email to recipients B and C specified in email 1.

Figure 6A:
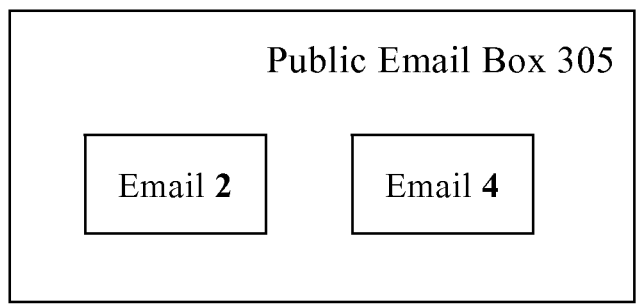
Figure 6B:
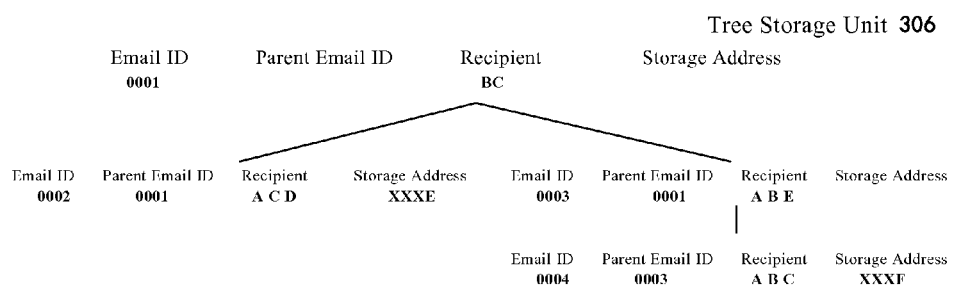

Because email 1 does not carry with a parent email ID, an email ID (0001), recipients (B, C) of email 1, and its storage address (null) in the public email box may be recorded at a root node of a newly established tree in the tree storage unit 306, as shown in FIG. 6b.

For each tree in the tree storage unit 306, a corresponding public recipient record list 307 may be provided. A trigger mechanism may be provided in the tree storage unit 306. Because a node (root) record has been added for email 1 in the tree storage unit 306, recipients B, C recorded at the newly added node may be added into a public recipient record list 307 corresponding to the tree.

(2) Email 2

Next, user B replies email sent by user A and adds a recipient D when replies, selects to mark the replied email as public to produce a public email 2.

The receiving component 303 may receive the public email 2. The ID mechanism of the server may first find that a parent email ID (0001) is carried on email 2. Then, an email ID may be automatically assigned to email 2 by the ID mechanism of existing servers, that is, 0002.

Because email 2 is a public email, the acquisition component 310 may acquire public recipients. Because the record of email 2 has not been added to the tree storage unit 306, and there may only be a record of email 1 which is the parent of email 2 in the tree storage unit 306, the acquisition component 310, based on a tree in the tree storage unit 306 where a node (root) corresponding to the parent email ID (0001) of the received email 2 locates, may acquire public recipients B, C from a public recipient record list 307 corresponding to that tree.

Because A, C, D are specified in email 2 as recipients, B, C may be acquired as public recipients by the acquisition component 310, the sending component 304 may actually send the email to A, B, C, D or A, C, D.

Because email 2 is a public email, the storage component 308 may store email 2 in the public email box 305, as shown in FIG. 6a.

Because email 2 carries with a parent email ID (0001), the record component 309 may record the email ID (0002), the parent email ID (0001), recipients (A, C, D) of email 2, and its storage address (XXXE) in the public email box at a child node of a node (root) with the email ID 0001 in the tree storage unit 306, as shown in FIG. 6b.

Because a node record is added for email 2 in the tree storage unit 306, the trigger mechanism may automatically combine the recipients A, C, D recorded at the newly added node to the public recipient record list 307 corresponding to the tree. At that point, public recipients in the public recipient record list 307 are A, B, C, D.

(3) Email 3

Next, user C and user B reply the email sent by user A in parallel, and a recipient E is added in the reply to generate email 3. Email 3 is not marked as public.

The receiving component 303 may receive email 3. The ID mechanism of the server may first find that email 3 carries with a parent email ID (0001). Then, the ID mechanism of the server may automatically assign an email ID to email 3, i.e., 0003.

Because email 3 is not a public email, the sending component 304 may only send email 3 to recipients A, B, E specified in email 3.

Because a parent email ID (0001) is carried on email 3, the record component 309 may also record the email ID (0003), the parent email ID (0001), recipients (A, B, E) of email 3, and its storage address (null) in the public email box (null) at the child node of the node (root) with the email ID 0001 in the tree storage unit 306, as shown in FIG. 6b.

Because a node record is added for email 3 in the tree storage unit 306, the trigger mechanism may automatically combine the recipients A, B, E recorded at the newly added node to the public recipient record list 307 corresponding to the tree. At that point, public recipients in the public recipient record list 307 are A, B, C, D, E.

(4) Email 4

When user E replies to all, users A-C are all in recipients of the replied email. User E selects to mark the replied email as public to generate a public email 4.

The receiving component 303 may receive public email 4. The ID mechanism of the server may first find that email 4 carries with a parent email ID (0003). Then, the ID mechanism of the server may automatically assign an email ID to email 4, i.e., 0004.

Because email 4 is a public email, it may be necessary for the acquisition component 310 to acquire public recipients. Because the record of email 2 has not been added to the tree storage unit 306, the acquisition component 310, based on a tree in the tree storage unit 306 where a node (the node of email 3) corresponding to the parent email ID (0003) of the received email 4 locates, may acquire public recipients A, B, C, D, E from a public recipient record list 307 corresponding to that tree.

Because A, B, C are specified as recipients in email 4, A, B, C, D, E are public recipients acquired by the acquisition component 310, the sending component 304 may actually send the email to A, B, C, D, E or A, B, C, D. Although recipient D is not specified as a recipient in email 4, he may receive email 4 also, because recipient D participated in discussions about that topic previously.

Because email 4 is a public email, the storage component 308 may store email 4 in the public email box 305, as shown in FIG. 6a.

Because a parent email ID (0003) is carried on email 4, the record component 309 may also record the email ID (0004), the parent email ID (0003), recipients (A, B, C) of email 4, and its storage address (XXXF) in the public email box at the child node of the node with the email ID 0003 in the tree storage unit 306, as shown in FIG. 6b.

Because a node record is added for email 4 in the tree storage unit 306, the trigger mechanism may automatically combine the recipients A, B, C recorded at the newly added node to the public recipient record list 307 corresponding to the tree. At that point, public recipients in the public recipient record list 307 are A, B, C, D, E, as shown in FIG. 6C.

This embodiment may also provide a consolidation function. For example, the consolidation indication providing component 313 may provide a consolidation indication on email 4 sent to user D. If user D selects the consolidation indication, the email consolidation component 314 may searche for all emails (emails 2, 4) having non-null storage addresses in the public email box on a tree in the tree storage unit 306 where the node of email 4 locates, may find out contents of those emails in the public email box 305, and may consolidate their contents and the content of the current email. Therefore, user D may be able to view consolidated emails 2, 4, and thus gain complete information about that topic.

Then, the second situation will be discussed.

(1) Email 1

Email 1 is not a public email. The process (1) of the second situation may differ from the process (1) of the first situation in that: in the second situation, the trigger mechanism of the tree storage unit 306 may cause that, although a node (root) record is added for email 1 in the tree storage unit 306, however email 1 is not a public email (because its storage address in the public email box is null), recipients recoded at the newly added node may not be added to the public recipient record list 307 corresponding to that tree. There is may not be a public recipient in the public recipient record list 307.

(2) Email 2

Email 2 is a public email. It may be necessary for the acquisition component 310 to acquire public recipients. Since there is no public recipient in the public recipient record list 307 at that time, no public recipient may be acquired by the acquisition component 310. Because A, C, D are specified as recipients in email 2, the sending component 304 may send email 2 to A, C, D.

Since a corresponding node may be added for email 2 in the tree storage unit 306, and email 2 may be a public email (its storage address in the public email box is non-null), the recipients A, C, D recorded at the newly added node are added to the public recipient record list 307 corresponding to that tree. At that point, public recipients in the public recipient record list 307 are A, C, D.

Other part of the process (2) of the second situation may be generally similar to that of the process (2) of the first situation.

(3) Email 3

Email 3 is not a public email. The process (3) of the second situation may differ from the process (3) of the first situation in that: in the second situation, the trigger mechanism of the tree storage unit 306 may cause that, although a node record is added for email 3 in the tree storage unit 306, however email 1 is not a public email (since its storage address in the public email box may be null), recipients recoded at the newly added node still may not be added to the public recipient record list 307 corresponding to that tree. Public recipients in the public recipient record list 307 are still A, C, D.

(4) Email 4

Email 4 is a public email. It may be necessary for the acquisition component 310 to acquire public recipients. Since the public recipients in the public recipient record list 307 are A, C, D at that time, while A, B, C are recipients specified in email 4, the sending component 304 sends email 4 to A, B, C, D.

Because a corresponding node may be added for email 4 in the tree storage unit 306, and email 4 may be a public email (its storage address in the public email box is non-null), the recipients A, B, C recorded at the newly added node are added to the public recipient record list 307 corresponding to that tree. At that point, public recipients in the public recipient record list 307 are A, B, C, D, which is different from that of FIG. 6c.

Other part of the process (4) of the second situation may be generally similar to that of the process (4) of the first situation.

This embodiment may also provide a consolidation function. For example, the consolidation indication providing component 313 may provide a consolidation indication on email 4 sent to user D. If user D selects the consolidation indication, the email consolidation component 314 may searche for all emails (emails 2, 4) having non-null storage addresses in the public email box on a tree in the tree storage unit 306 where the node of email 4 locates, may find out contents of those emails in the public email box 305, and may consolidate their contents and the content of the current email. Therefore, user D may view consolidated emails 2, 4, and thus gain complete information about that topic.

FIG. 3 and FIG. 5 merely illustrate two embodiments of the present disclosure. Based on the above teaching, those skilled in the art may conceive other embodiments, which are all fall within the scope of the present disclosure. For example, it may be possible to add a public recipient record list in FIG. 3 and employ a trigger mechanism in the email information list 315. Once a new email record or new public email record appears in the email information list 315, the trigger mechanism may automatically copy recipients in the record into the public recipient record list. Thereby, the acquisition component 310 may be able to directly acquire public recipients from the public recipient record list. For example, the public recipient record list 307 of FIG. 5 may be removed. Instead, when the acquisition component 310 requires acquiring public recipients, it may combine recipients at all email nodes or public email nodes on a corresponding tree in the tree storage unit 306 to generate public recipients.

Further, the acquisition component 310 may acquire not only recipients of emails having the same root email as a received email marked as public, but also public recipients under all root emails. Certainly, this may be merely applicable in some special environments.

Further, although the public email box 305, email information list 315 of FIG. 3 and the public email box 305, tree storage unit 306, public recipient record list 307 of FIG. 5 are shown as being provided in the device 302 for providing public email on the server side, instead of on the server side, they can be provided at a separate position (such as, a third party storage space) communicating with the server.

Figure 7:
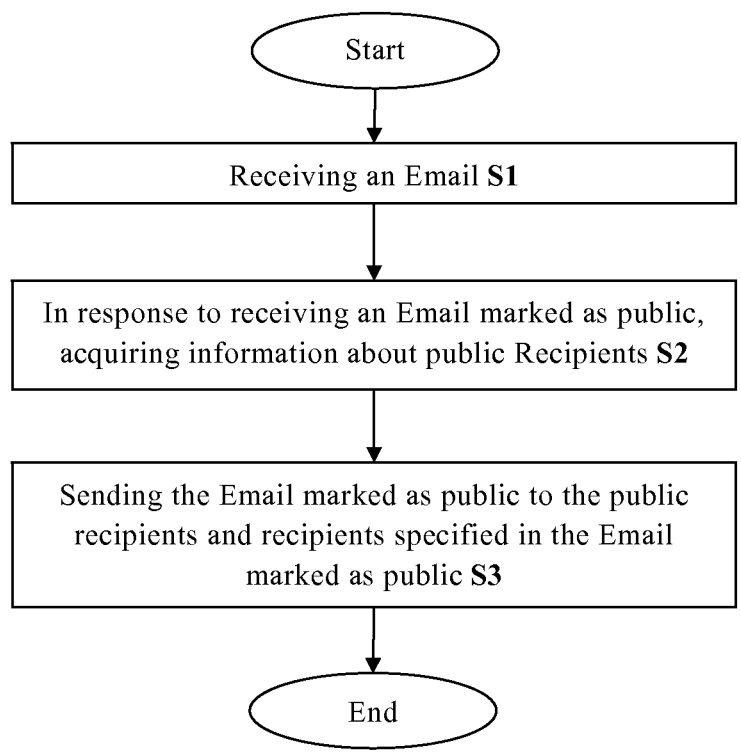
FIG. 7 shows a flowchart of a method for providing public email according to an embodiment of the present disclosure.

As shown in FIG. 7, the method for providing public email according to an embodiment of the present disclosure may include: at step S1, receiving an email; at step S2, in response to receiving an email marked as public, acquiring information about public recipient; at step S3, sending the email marked as public to the public recipients and recipients specified in the email marked as public.

Optionally, when an email is created or sent by an email sender, the email server may provide a prompt to the email sender that there is an option of providing a public mark to the email.

With regard to marking an email to be sent to public as selected by the email sender, the email server may adopt one of the following two process manners.

According to one implementation, in response to selecting to mark the email to be sent as public by an email sender, the email server may add a public mark to a next email that will be sent during his subsequent email reply process. In other words, only a next email may be a public email.

According to another implementation, in response to selecting to mark the email to be sent as public by an email sender, the email server may automatically add a public mark to every email that will be sent during his subsequent email reply process. In other words, all emails that will be sent in subsequent email reply process of the sender may be public emails. If the sender selects to cancel, emails sent by the sender subsequently may turn into normal emails again.

One of the following manners may be employed to provide an email sender with a prompt of selectively adding a public mark to an email: adding a public mark button beside a "send"

button of the email; adding a public mark check box in preference options of the email; providing a prompt of adding a public mark in the main menu of the email; in response to a click on a "send" button, displaying a prompt of adding a public mark to the email sender; in response to clicking the right button of a mouse on a blank area in the text field of the email, providing an option of adding a public mark to the email sender.

Optionally, all emails marked as public that have been consolidated may be displayed in a window, a separate page or below an email text page in their reply sequence. It shall be understood that the present disclosure is not limited thereto, and consolidated emails can be displayed in various manners, which are all within the scope of the present disclosure.

Optionally, when an email is marked as public, the email marked as public may be displayed in a form different from personal emails of a recipient, such as, in the form of adding a mark, identifying that the email is a public email before the subject of the email, or in a highlight manner, to highlight the email as an email marked as public. It can be understood that there are various manners for marking an email as public, which are all within the scope of the present disclosure.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the market place, or to enable others of ordinary skill in the art to understand the embodiments disclosed herein.

What is claimed is:

1. A method for providing public email, comprising:
   receiving, by one or more processors, an email;
   in response to receiving an email marked as public, acquiring, by the one or more processors, information about public recipients;
   sending, by the one or more processors, the email marked as public to the public recipients and recipients specified in the email marked as public.

2. The method according to claim 1, comprising:
   acquiring, as the public recipients, information about recipients of emails having a same root email as the received email marked as public.

3. The method according to claim 2, further comprising:
   storing the email marked as public into a public email box; and
   recording, in an email information list, an email ID, a root email ID, recipients of the received email, and its storage address in the public email box, wherein if the received email is not marked as public, its storage address in the public email box is null; wherein determining the root email ID includes: if the received email does not carry with a parent email ID, it is not an email produced through reply or forward, and its email ID is just the root email ID; if the received email carries with a parent email ID, it is an email produced through reply or forward, a root email ID in a corresponding record of its parent email in the email information list is used as its root email ID.

4. The method according to claim 3, wherein acquiring information about public recipients comprises:
   combining all recipients of emails having the same root email ID as the received email marked as public in the email information list to produce the public recipients.

5. The method according to claim 3, wherein acquiring information about public recipients comprises:
   combining all recipients of emails having the same root email ID as the received email marked as public in the email information list and having non-null storage addresses in the public email box to produce the public recipients.

6. The method according to claim 3, wherein, in response to receiving a consolidation selection by a recipient of the email after receiving the email marked as public, searching the email information list for all emails having the same root email ID as the received email marked as public and having non-null storage addresses in the public email box, and looking up the public email box for contents of those emails, which are then consolidated into the content of the current email.

7. The method according to claim 2, further comprising:
   storing the email marked as public into the public email box;
   in response to receiving the email, recording an email ID, a parent email ID, recipients of the received email, and a storage address of the received email in the public email box at a corresponding node of a tree stored in a tree storage unit; wherein if the received email is not marked as public, the storage address of the received email in the public email box is null; if the received email does not carry with the parent email ID, then the email ID, recipients of said received email, and the storage address of the received email in the public email box are recorded at a root node of a new tree; if the received email carries with a parent email ID, then the email ID, parent email ID, recipients of the received email, and the storage address of the received email in the public email box are recorded at a child node of a node having the parent email ID as its email ID.

8. The method according to claim 7, wherein acquiring information about public recipients comprises:
   providing a public recipient record list corresponding to a tree in the tree storage unit, wherein in response to adding a new node to the tree in the tree storage unit, recipients recorded at the new node are combined into the public recipient record list corresponding to the tree;

based on a tree in the tree storage unit where a node corresponding to the parent email ID of the received email marked as public locates, acquiring the public recipients from a public recipient record list corresponding to that tree.

9. The method according to claim 7, wherein acquiring information about public recipients comprises:
providing a public recipient record list corresponding to a tree in the tree storage unit, wherein in response to adding a new node to the tree in the tree storage unit, which has a non-null storage address in the public email box recorded thereon, recipients recorded at the new node are combined into the public recipient record list corresponding to the tree;
based on a tree in the tree storage unit where a node corresponding to the parent email ID of the received email marked as public locates, acquiring the public recipients from a public recipient record list corresponding to that tree.

10. The method according to claim 7, wherein in response to selecting consolidation by a recipient of the email after receiving the email marked as public, a tree in the tree storage unit where the node of the email locates is searched for all emails having non-null storage addresses in the public email box, and the public email box is looked up for contents of those emails, which are then consolidated into the content of the current email.

11. A device for providing public email, comprising:
a computer processor; and
a computer memory operatively coupled to the computer processor, the computer memory having disposed within it computer program instructions configured to:
receive an email;
in response to receiving an email marked as public, acquire information about public recipients; and
send the email marked as public to the public recipients and recipients specified in the email marked as public.

12. The device according to claim 11, wherein the computer program instructions are configured to acquire, as the public recipients, information about recipients of emails having the same root email as the received email marked as public.

13. The device according to claim 12, further comprising computer program instructions configured to:
store the email marked as public into a public email box; and
record, in an email information list, an email ID, a root email ID, recipients of the received email, and a storage address of the received email in the public email box, wherein if the received email is not marked as public, the storage address of the received email in the public email box is null; the root email ID is determined as follows: if the received email does not carry with a parent email ID, it is not an email produced through reply or forward, and the email ID of the received email is just the root email ID; if the received email carries with a parent email ID, it is an email produced through reply or forward, a root email ID in a corresponding record of its parent email in the email information list is used as the root email ID.

14. The device according to claim 13, wherein the computer program instructions are configured to combine all recipients of emails having the same root email ID as the received email marked as public in the email information list to produce the public recipients.

15. The device according to claim 13, wherein the computer program instructions are configured to combine all recipients of emails having the same root email ID as the received email marked as public in the email information list and having non-null storage addresses in the public email box to produce the public recipients.

16. The device according to claim 13, further comprising computer program instructions configured to:
in response to selecting consolidation by a recipient of the email after receiving the email marked as public, search the email information list for all emails having the same root email ID as the received email marked as public and having non-null storage addresses in the public email box, and look up the public email box for contents of those emails, and consolidate those contents into the content of the current email.

17. The device according to claim 12, further comprising computer program instructions configured to:
store the email marked as public into the public email box;
in response to receiving the email, record an email ID, a parent email ID, recipients of the received email, and a storage address of the received email in the public email box at a corresponding node of a tree stored in a tree storage unit; wherein if the received email is not marked as public, the storage address of the received email in the public email box is null; if the received email does not carry with the parent email ID, then the email ID, recipients of the received email, and the storage address of the received email in the public email box are recorded at a root node of a new tree; if the received email carries with a parent email ID, then the email ID, parent email ID, recipients of the received email, and the storage address of the received email in the public email box are recorded at a child node of a node having the parent email ID as its email ID.

18. The device according to claim 17, wherein a public recipient record list corresponding to a tree in the tree storage unit is provided, wherein in response to adding a new node to the tree in the tree storage unit, recipients recorded at the new node are combined into the public recipient record list corresponding to the tree; and
based on the tree in the tree storage unit where a node corresponding to the parent email ID of the received email marked as public locates, acquire the public recipients from the public recipient record list corresponding to that tree.

19. The device according to claim 17, wherein a public recipient record list corresponding to a tree in the tree storage unit is provided, wherein in response to adding a new node to the tree in the tree storage unit, which has a non-null storage address in the public email box recorded thereon, recipients recorded at the new node are combined into the public recipient record list corresponding to the tree; and
based on the tree in the tree storage unit where a node corresponding to the parent email ID of the received email marked as public locates, acquire the public recipients from the public recipient record list corresponding to that tree.

20. The device according to claim 17, further comprising computer program instructions configured to:
in response to selecting consolidation by a recipient of the email after receiving the email marked as public, search a tree in the tree storage unit where the node of the email locates for all emails having non-null storage addresses in the public email box, and look up the public email box for contents of those emails, and consolidate those contents into the content of the current email.

21. A system for providing public email, comprising:
a device for providing public email, the device including:
a computer processor;

a computer memory operatively coupled to the computer processor, the computer memory having disposed within it computer program instructions configured to:

receive an email;

in response to receiving an email marked as public, acquire information about public recipients;

send the email marked as public to the public recipients and recipients specified in the email marked as public; and an email client device configured to communicate with the device for providing public email.

\* \* \* \* \*